United States Patent

Mochida

(10) Patent No.: US 9,429,931 B2
(45) Date of Patent: Aug. 30, 2016

(54) NUMERICAL CONTROLLER FOR CONTROLLING FEED SPEED

(71) Applicant: FANUC Corporation, Minamitsuru-gun, Yamanashi (JP)

(72) Inventor: Takeshi Mochida, Minamitsuru-gun (JP)

(73) Assignee: FANUC Corporation, Minamitsuru-gun, Yamanashi (JP)

(*) Notice: Subject to any disclaimer, the term of this patent is extended or adjusted under 35 U.S.C. 154(b) by 303 days.

(21) Appl. No.: 14/284,430

(22) Filed: May 22, 2014

(65) Prior Publication Data

US 2014/0350709 A1 Nov. 27, 2014

(30) Foreign Application Priority Data

May 23, 2013 (JP) ................. 2013-109211

(51) Int. Cl.
| | |
|---|---|
| G05B 19/402 | (2006.01) |
| G05B 19/19 | (2006.01) |
| G06F 19/00 | (2011.01) |
| G05B 15/00 | (2006.01) |
| G05B 19/00 | (2006.01) |
| G05B 19/416 | (2006.01) |

(52) U.S. Cl.
CPC ........... *G05B 19/402* (2013.01); *G05B 19/416* (2013.01); *G05B 2219/49001* (2013.01)

(58) Field of Classification Search
USPC ........................................................ 700/114
See application file for complete search history.

(56) References Cited

U.S. PATENT DOCUMENTS

| | | | | |
|---|---|---|---|---|
| 5,528,506 A | * | 6/1996 | Yoshida | G05B 19/4103 318/571 |
| 2004/0225405 A1 | * | 11/2004 | Takahashi | B25J 9/1666 700/178 |
| 2007/0213866 A1 | | 9/2007 | Maki et al. | |
| 2016/0011579 A1 | * | 1/2016 | Watanabe | G05B 19/4103 700/187 |

FOREIGN PATENT DOCUMENTS

| | | | | |
|---|---|---|---|---|
| CN | 101581927 A | | 11/2009 | |
| CN | 102945020 A | | 2/2013 | |
| EP | 0440805 B1 | * | 12/1994 | ........... G05B 19/407 |
| JP | H05-143145 A | | 6/1993 | |
| JP | 3151256 B2 | | 2/1994 | |
| JP | H06-95727 A | | 4/1994 | |
| JP | H07191728 A | | 7/1995 | |

(Continued)

OTHER PUBLICATIONS

Notice of Grounds for Rejection issued Oct. 14, 2014 in corresponding Japanese Patent Application No. 2013-109211 (2 pages) with English Translation (2 pages).

*Primary Examiner* — Mohammad Ali
*Assistant Examiner* — Md Azad
(74) *Attorney, Agent, or Firm* — Drinker Biddle & Reath LLP

(57) ABSTRACT

A numerical controller obtains a necessary moving distance for the completion of movement in each interpolation period, based on a moving distance for each block and the input ratio of a distance by which movement is completed in each interpolation period to the moving distance for each block. If the obtained moving distance is shorter than the moving distance for each interpolation period based on an initially set feed speed, the feed speed is changed to a speed for moving the moving distance in each interpolation period.

5 Claims, 7 Drawing Sheets

(56) References Cited

FOREIGN PATENT DOCUMENTS

| JP | H0850504 A | 2/1996 |
| JP | 2724647 B2 | 3/1998 |
| JP | H10333732 A | 12/1998 |
| JP | 2007-094936 A | 4/2007 |
| JP | 2007191728 A | 8/2007 |
| JP | 2007-245247 A | 9/2007 |

* cited by examiner

NUMERICAL CONTROLLER FOR CONTROLLING FEED SPEED

RELATED APPLICATION DATA

This application claims priority under 35 U.S.C. §119 and/or §365 to Japanese Application No. 2013-109211 filed May 23, 2013, the entire contents is incorporated herein by reference.

BACKGROUND OF THE INVENTION

1. Field of the Invention

The present invention relates to a numerical controller for controlling a machine tool, and more particularly, to a numerical controller for controlling a feed speed for linear or circular interpolation.

2. Description of the Related Art

In a numerical controller for controlling a machine tool, speed control is performed for an arbitrarily assigned feed speed. In assigning a high feed speed, if linear or circular interpolation with a block length that allows a movement to be completed within an interpolation period is commanded with multi-block overlap enabled, a shape that is formed by connecting control points for each interpolation period as a unit connected by straight lines is machined. In some cases, therefore, programmed shapes in intermediate blocks may fail to be reflected.

Thus, if a programmed shape is expected to be maintained during machining, the speed is conventionally controlled so that the feed speed between blocks is reduced to zero by an exact stop, or the shape is maintained by means of a deceleration function to suppress speed or acceleration change attributable to the change of movement direction.

If a high tolerance is set for the deceleration function based on the speed or acceleration change, movement may fail to be completed in an interpolation period. In such a case, the speed cannot be reduced to a proper level, so that the programmed shape cannot be maintained. Although the speed must be further reduced to prevent this, there may be a request to avoid speed reduction in an undesired place for high-speed machining, or in contrast, the programmed shape may be expected to be maintained. To maintain the programmed shape, an exact stop command or feed speed must be changed in programming in consideration of the feed speed and block length in the stage of programming. In many cases, however, the feed speed is kept constant during machining, so that it is not easy to change programs in consideration of the feed speed and block length.

Japanese Patent Application Laid-Open No. 6-95727 discloses a technique in which a critical speed obtained from the time required for preprocessing means to read and analyze each block of a machining program is compared with a feed speed, in a feed speed clamping system of a numerical controller, and the lower of these speeds is clamped and output as a commanded speed.

According to the technique described above, however, the critical speed is calculated based on the time required to read and analyze each block of the machining program, so that an appropriate speed sometimes cannot be determined if the blocks vary in shape.

On the other hand, Japanese Patent Application Laid-Open No. 5-143145 discloses a technique in which an initial value of machining block processing time is previously set, and the feed speed is controlled according to functional patterns of read blocks of an NC program.

According to the technique described above, however, the allowable speed is calculated by analyzing the functional patterns of the machining blocks, so that the calculated speed may possibly vary depending on the time required for the analysis.

SUMMARY OF THE INVENTION

Accordingly, the object of the present invention is to provide a numerical controller capable of easily calculating a feed speed of each block that allows the block shape to be maintained.

A first aspect of a numerical controller according to the present invention is configured to control a path and a feed speed of a tool according to a machining program in which a first feed speed and a moving distance for each block are commanded. The numerical controller comprises an input unit configured to input the ratio of a distance by which movement is completed in each interpolation period to a moving distance for each block, a moving distance calculation unit configured to obtain a necessary distance for the completion of movement in each interpolation period based on the ratio input by the input unit and the moving distance for each block, a moving distance determination unit configured to determine whether or not the distance calculated by the moving distance calculation unit is shorter than the moving distance for each interpolation period based on the first feed speed, a moving speed calculation unit configured to calculate, as a second feed speed, a speed for moving, in each interpolation period, the distance obtained by the moving distance calculation unit if it is determined by the moving distance determination unit that the distance calculated by the moving distance calculation unit is shorter than the moving distance for each interpolation period based on the first feed speed, and a commanded speed changing unit configured to change the feed speed to the second feed speed obtained by the moving speed calculation unit.

According to the numerical controller of this aspect, it is determined whether or not the necessary moving distance for the completion of movement in each interpolation period, obtained based on the moving distance for each block for linear or circular interpolation, is shorter than the moving distance in each interpolation period based on the initial feed speed. If it is determined that the necessary moving distance for the completion of movement in each interpolation period is shorter and is not long enough to maintain the programmed shape in each block, the feed speed can be reduced so that the programmed shape can be maintained. Thus, the programmed shape in each block can be reliably reflected.

The numerical controller may further comprise a notification unit configured to make notification if the ratio of the distance by which movement is completed in each interpolation period to the moving distance for each block, which is input by the input unit, is higher than that set in advance.

Further, a second aspect of the numerical controller according to the present invention is configured to control a path and a feed speed of a tool according to a machining program in which a first feed speed and a moving distance for each block are commanded. The numerical controller comprises a moving distance determination unit configured to determine whether or not the moving distance for each block is shorter than a moving distance for each interpolation period based on the first feed speed, a moving speed calculation unit configured to obtain, as a second feed speed lower than the first feed speed, a speed for each block if it is determined by the moving distance determination unit that the moving distance for each block is shorter than the moving distance for each interpolation period based on the first feed speed, and a commanded speed changing unit configured to change the feed speed to the second feed speed obtained by the moving speed calculation unit.

According to the numerical controller of this aspect, it is determined whether or not the moving distance for each block for linear or circular interpolation is shorter than the moving distance in each interpolation period based on the initial feed speed. If it is determined that the moving distance for each block is shorter and is not long enough to maintain the programmed shape in each block, the feed speed can be reduced so that the programmed shape can be maintained. Thus, the programmed shape in each block can be reliably reflected.

The moving speed calculation unit may be configured to obtain, as the second feed speed, a speed for moving the moving distance for each block in each interpolation period, calculate the second feed speed based on the first feed speed and a preset ratio, or use a preset speed as the second feed speed.

According to the present invention, there can be provided a numerical controller capable of easily calculating a feed speed of each block that allows the block shape to be maintained.

BRIEF DESCRIPTION OF THE DRAWINGS

The above and other objects and features of the present invention will be apparent from the ensuing description of embodiments with reference to the accompanying drawings, in which.

DETAILED DESCRIPTION OF THE PREFERRED EMBODIMENTS

Figure 1:
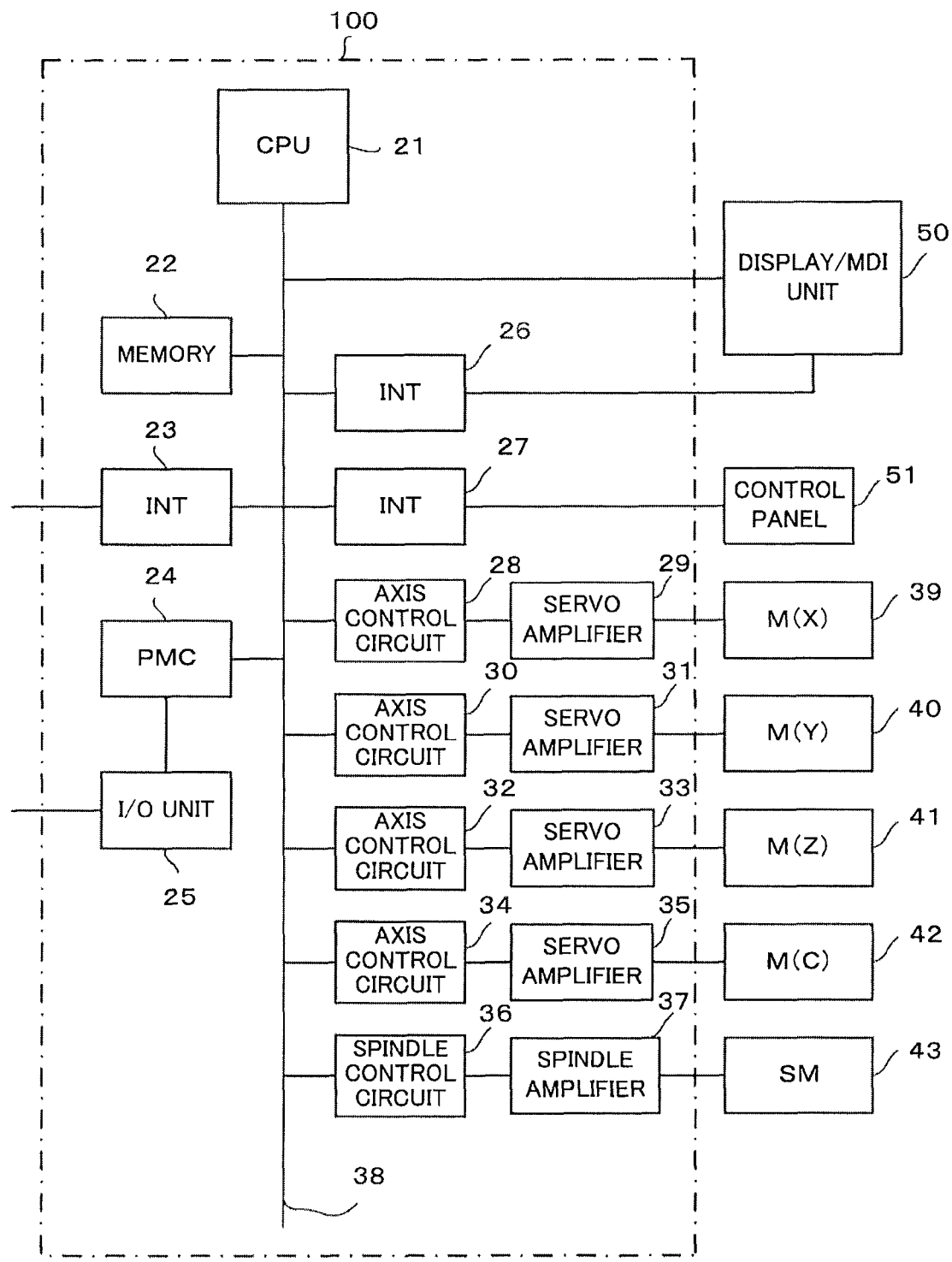
FIG. 1 is a block diagram of one embodiment of a numerical controller according to the present invention.

First, one embodiment of a numerical controller according to the present invention will be described with reference to the block diagram of FIG. 1.

A CPU 21 is a processor configured to generally control a numerical controller for four-axis machine (hereinafter simply referred to as the "numerical controller") 100. The CPU 21 reads a system program stored in a ROM area of a memory 22 through a bus 38 and controls whole of the numerical controller in accordance with the read system program. A RAM area of the memory 22 is loaded with temporary calculation data, display data, and various data input by an operator through a display/manual data input (MDI) unit 50. Further, a nonvolatile memory area composed of an SRAM or the like of the memory 22 is stored with a machining program read through an interface 23, a machining program input through the display/MDI unit 50, etc.

The interface 23 enables connection between the numerical controller 100 and an external device such as an adapter (not shown). Machining programs and various parameters are read from the external device. Further, the machining programs edited in the numerical controller 100 can be stored into external storage means (not shown) through the external device.

A programmable machine controller (PMC) 24 controls auxiliary devices of a machine tool by outputting signals to them through an I/O unit 25 based on sequential programs in the numerical controller 100. On receiving signals from various switches of a control panel on the body of the machine tool, moreover, the PMC 24 performs necessary signal processing and then delivers the signals to the CPU 21.

The display/MDI unit 50 is a manual data input device with a display, keyboard, etc. An interface 26 receives a command and data from the keyboard of the display/MDI unit 50 and delivers them to the CPU 21. An interface 27 is connected to a control panel 51 that is furnished with a manual pulse generator and the like.

Axis control circuits 28, 30, 32 and 34 for X-, Y-, Z-, and C-axes receive move commands for the individual axes from the CPU 21 and output the axis commands to corresponding servo amplifiers 29, 31, 33 and 35. On receiving these commands, the servo amplifiers 29, 31, 33 and 35 drive corresponding servomotors 39 to 42 for the individual axes. The axes perform position/speed feedback control, which is not described in detail herein.

The servomotors 39 to 42 drive the X-, Y-, Z-, and C-axes of the machine tool. A spindle control circuit 36 receives a spindle rotation command and outputs a spindle speed signal to a spindle amplifier 37. On receiving the spindle speed signal, the spindle amplifier 37 rotates a spindle motor 43 at a commanded rotational speed.

An outline of feed speed control in the numerical controller of the present invention will now be described with reference to FIGS. 2A and 2B.

Figure 2A:
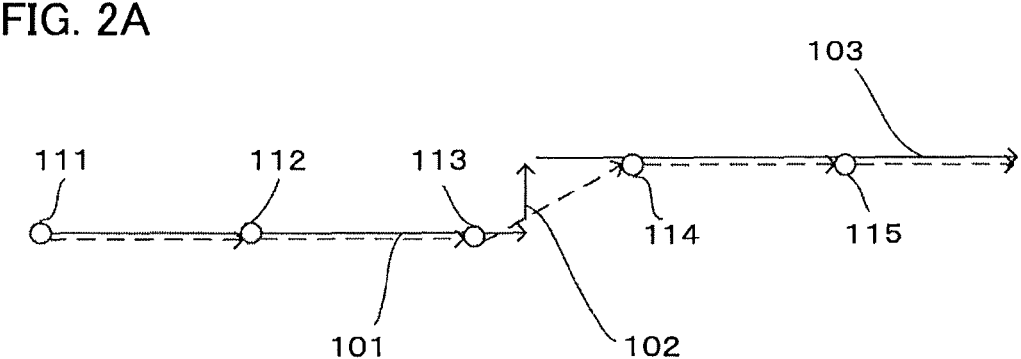
FIGS. 2A and 2B are diagrams illustrating an outline of feed speed control based on linear interpolation in the numerical controller of the present invention.
Figure 2B:
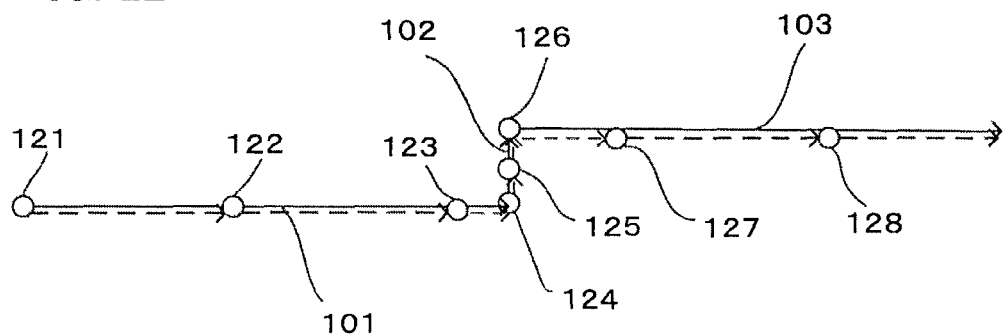

FIGS. 2A and 2B are diagrams illustrating examples of linear interpolation. In FIGS. 2A and 2B, a program path is indicated by full lines, and numbers 101, 102 and 103 denote blocks 1, 2 and 3, respectively. The block 1 (101) of the program path is a straight-line path, which turns left at right angles to the direction of travel, to form the block 2 (102), which is also a straight-line path. Further, the program path turns right at right angles to the direction of travel to form the block 3 (103), which is also a straight-line path.

Numbers 111 to 115 denote control points in each interpolation period. In an actual moving path, the machine tool moves straight between these control points. In the section between the control points 111 and 113 in FIG. 2A, the program path and moving path in the block 1 overlap each other. Also in the section between the control points 114 and 115, the program path and moving path in the block 3 overlap each other. In the section between the control points 113 and 114, however, straight-line movement causes a problem that the program path in the block 2 (102) cannot be maintained.

In contrast, if the ratio of a distance by which movement is completed in each interpolation period to an input moving distance for each block is set to 50%, for example, a moving distance half that of the block 2 is speed-controlled as a feed speed at which the movement is completed in each interpolation period. FIG. 2B shows the relationship between the program path and control points. The distances between control points 124 and 125 and between control points 125 and 126 in FIG. 2B are each set to be half the moving distance in the block 2 (102), so that the actual moving path is coincident with the program path in the block 2. If the positions of the control points are not coincident with the start and end points of the block 2 in FIG. 2B, the moving path on the block 2 is slightly deviated from the actual moving path. When compared with the case shown in FIG. 2A, however, these moving paths can be regarded as substantially coincident.

Figure 3A:
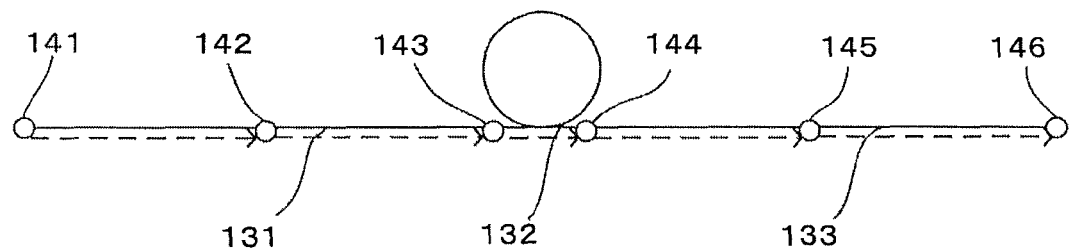
FIGS. 3A and 3B are diagrams illustrating an outline of feed speed control based on circular interpolation in the numerical controller of the present invention.
Figure 3B:
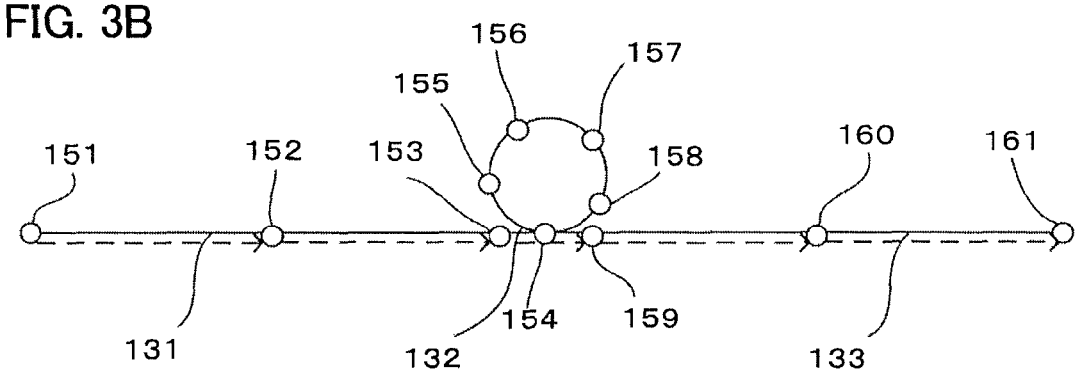

FIGS. 3A and 3B are diagrams illustrating examples of circular interpolation. In FIGS. 3A and 3B, a program path is indicated by full lines, and numbers 131, 132 and 133 denote blocks 1, 2 and 3, respectively. The block 1 (131) of the program path is a straight-line path, a circular path is formed in the middle of the block 2 (132), and the block 3 (133) is also a straight-line path.

Numbers 141 to 146 denote control points in each interpolation period. In an actual moving path, the machine tool moves straight between these control points. In the section between the control points 141 and 143 in FIG. 3A, the program path and moving path in the block 1 (131) overlap each other. Also in the section between the control points 144 and 146, the program path and moving path in the block 3 (131) overlap each other. In the section between the control points 143 and 144, however, straight-line movement causes a problem that the circular program path in the block 2 (132) cannot be maintained.

In contrast, if the ratio of a distance by which movement is completed in each interpolation period to a moving distance for each block is set to 20%, for example, a moving distance equal to 20% of that of the block 2 is speed-controlled as a feed speed at which the movement is completed in each interpolation period. FIG. 3B shows the relationship between the program path and control points. The distance between control points 154 and 155 and the like in FIG. 3B are each set to 20% of the moving distance in the block 2, so that the actual moving path is apparently coincident with the program path in the block 2.

If the moving distance in each interpolation period is long, as in the examples of FIGS. 2A and 3A, the path may sometimes fail to be maintained in middle blocks. If the moving distance in each interpolation period is properly set, as in the examples shown in FIGS. 2B and 3B; however, the path can be maintained in the blocks.

Based on the circumstances outlined above with reference to FIGS. 2A to 3B, a flow of feed speed control performed by a first embodiment of the numerical controller according to the present invention will be described with reference to the flowchart of FIG. 4. The following is a sequential description of steps of processing shown in the flowchart of FIG. 4.

[Step SA1] The moving distance for each block commanded in the machining program and an initially set first feed speed are acquired.

[Step SA2] The ratio of the distance by which movement is completed in each interpolation period to the moving distance for each block input from the input device, as a necessary ratio for the maintenance of the tool path, is acquired. For example, 50% is input as this ratio for the linear interpolation shown in FIG. 2B, and 20% is input as this ratio for the circular interpolation shown in FIG. 3B.

[Step SA3] A necessary distance for the completion of movement in each interpolation period is calculated based on the moving distance for each block acquired in Step SA1 and the ratio acquired in Step SA2. Specifically, the necessary distance for the completion of movement in each interpolation period is calculated by multiplying the moving distance for each block by the ratio.

[Step SA4] It is determined whether or not a value (distance) obtained by multiplying the moving distance for each block acquired in Step SA1 by the ratio acquired in Step SA2 is equal to or less than the moving distance for each interpolation period based on the first feed speed. If the resulting value is equal to or less than the moving distance for each interpolation period (YES), the program proceeds to Step SA5. If the moving distance for each interpolation period is exceeded (NO), this processing ends.

[Step SA5] A speed for moving, in each interpolation period, the value (distance) obtained by multiplying the moving distance for each block acquired in Step SA1 by the ratio acquired in Step SA2 is obtained as a second feed speed.

[Step SA6] An actual feed speed is changed to the second feed speed obtained in Step SA5.

Figure 5:
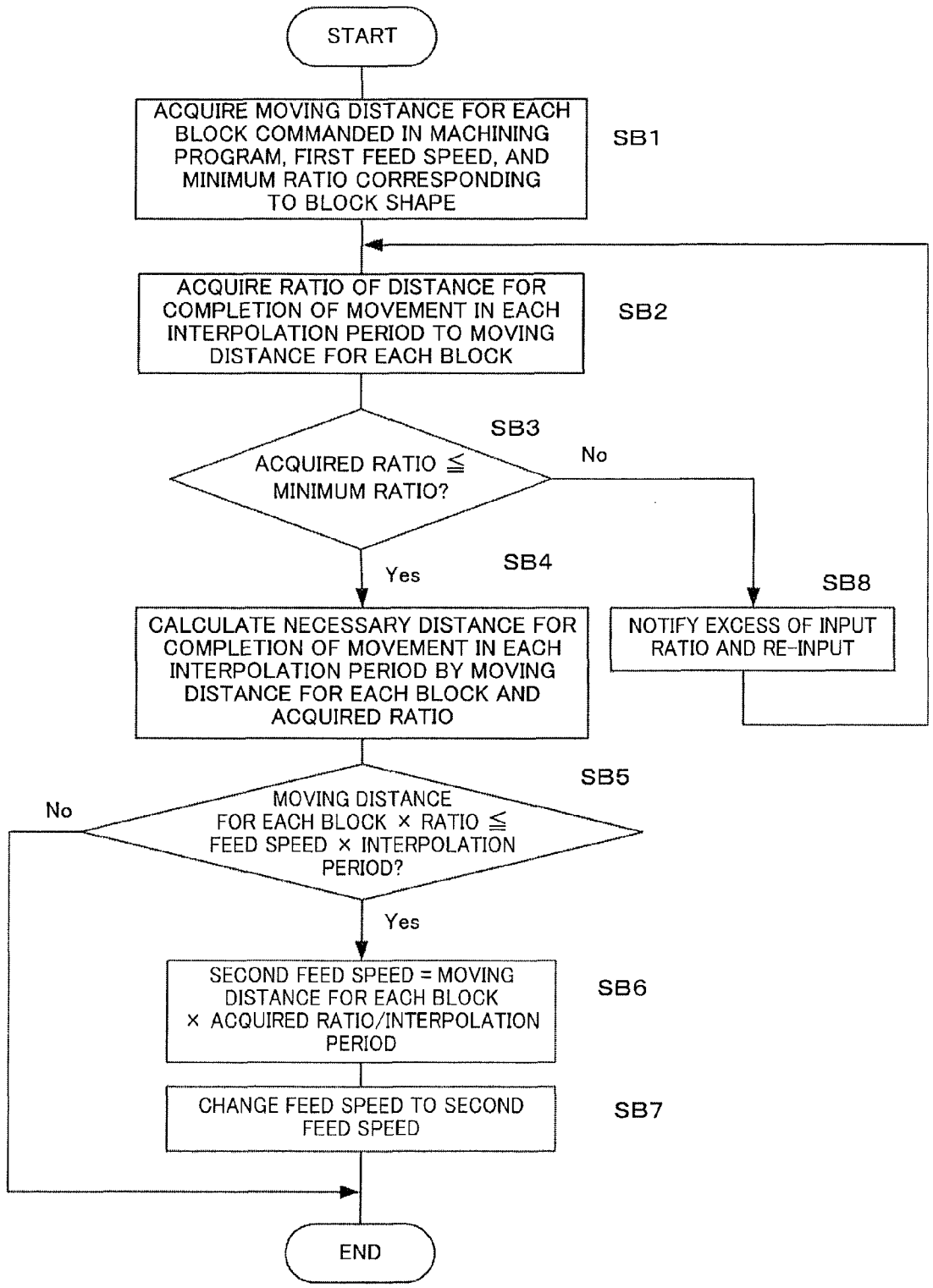
FIG. 5 is a flowchart showing a flow of feed speed control performed by a second embodiment of the numerical controller according to the present invention.

A flow of feed speed control performed by a second embodiment of the numerical controller according to the present invention will now be described with reference to the flowchart of FIG. 5.

In the first embodiment (FIG. 4) described above, the ratio of the distance by which movement is completed in each interpolation period to the moving distance for each block, which is needed to maintain the tool path, is input from the input device. Depending on the value of the input ratio, however, the tool path cannot be properly maintained, in some cases. To avoid this, according to this second embodiment, a minimum necessary ratio value is previously set according to the block shape. If the input ratio value is more than the preset value, in this case, that effect is reported, re-input is induced, or the input ratio value is changed to a preset value. The following is a sequential description of steps of processing shown in the flowchart of FIG. 4.

[Step SB1] A moving distance for each block commanded in a machining program, an initially set first feed speed, and the minimum ratio of a distance by which movement is completed in each interpolation period to the moving distance for each block, corresponding to the block shape, are acquired.

[Step SB2] A ratio input from the input device is acquired as the ratio of the distance by which movement is completed in each interpolation period to the moving distance for each block, which is needed to maintain the tool path. For example, 50% is input as this ratio for the linear interpolation shown in FIG. 2B, and 20% is input as this ratio for the circular interpolation shown in FIG. 3B.

[Step SB3] It is determined whether or not the ratio acquired in Step SB2 is equal to or less than the minimum ratio acquired in Step SB1. If the acquired ratio is equal to or less than the minimum ratio (YES), the program proceeds to Step SB4. If not (NO), the program proceeds to Step SB8.

[Step SB4] A necessary distance for the completion of movement in each interpolation period is calculated based on the moving distance for each block acquired in Step SB1 and the ratio acquired in Step SB2. Specifically, the necessary distance for the completion of movement in each interpolation period is calculated by multiplying the moving distance for each block by the ratio.

[Step SB5] It is determined whether or not a value obtained by multiplying the moving distance for each block acquired in Step SB1 by the ratio acquired in Step SB2 is equal to or less than the moving distance for each interpolation period based on the first feed speed. If the resulting value is equal to or less than the moving distance based on the first feed speed (YES), the program proceeds to Step SB6. If the moving distance based on the first feed speed is exceeded (NO), this processing ends.

[Step SB6] A speed for moving, in each interpolation period, the value (distance) obtained by multiplying the moving distance for each block acquired in Step SB1 by the ratio acquired in Step SB2 is obtained as a second feed speed.

[Step SB7] An actual feed speed is changed to the second feed speed obtained in Step SB6.

[Step SB8] It is notified that the input ratio is too high and re-input is performed, whereupon the program returns to Step SB2.

Figure 6:
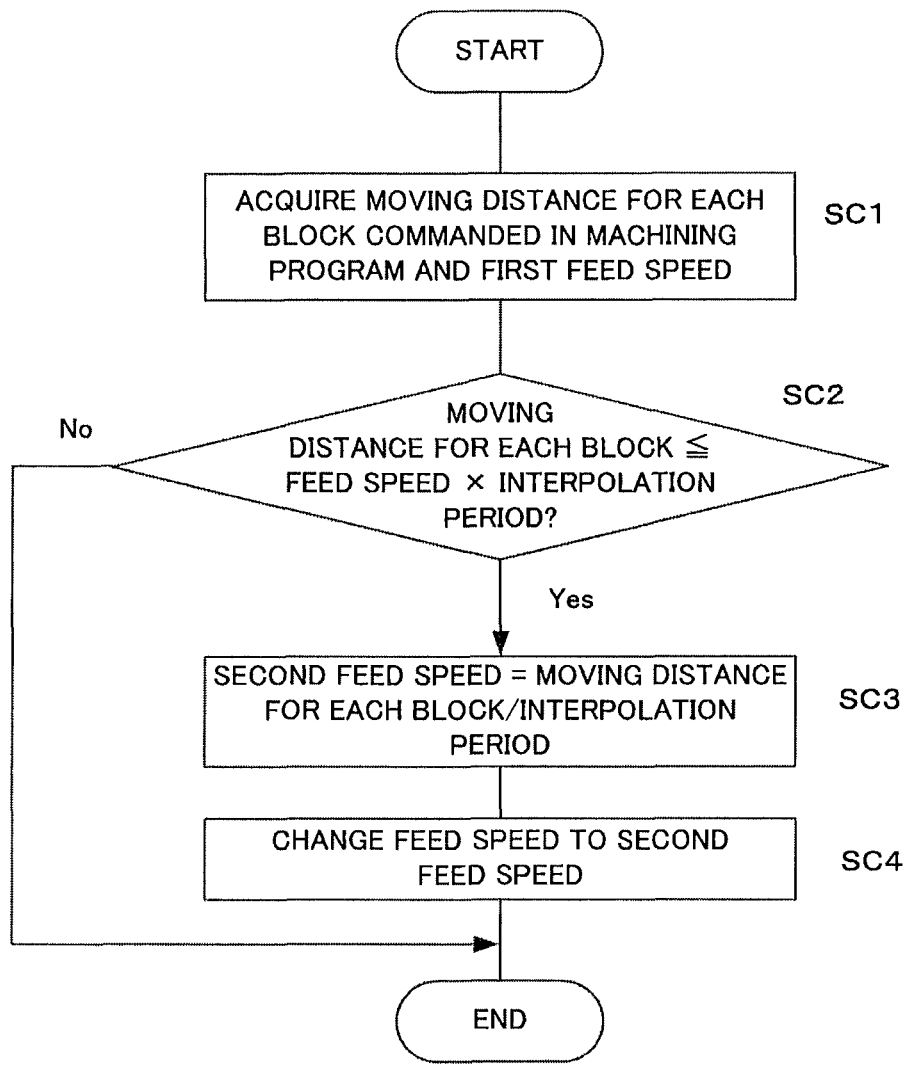
FIG. 6 is a flowchart showing a flow of feed speed control performed by a third embodiment of the numerical controller according to the present invention.

A flow of feed speed control performed by a third embodiment of the numerical controller according to the present invention will now be described with reference to the flowchart of FIG. 6.

Figure 4:
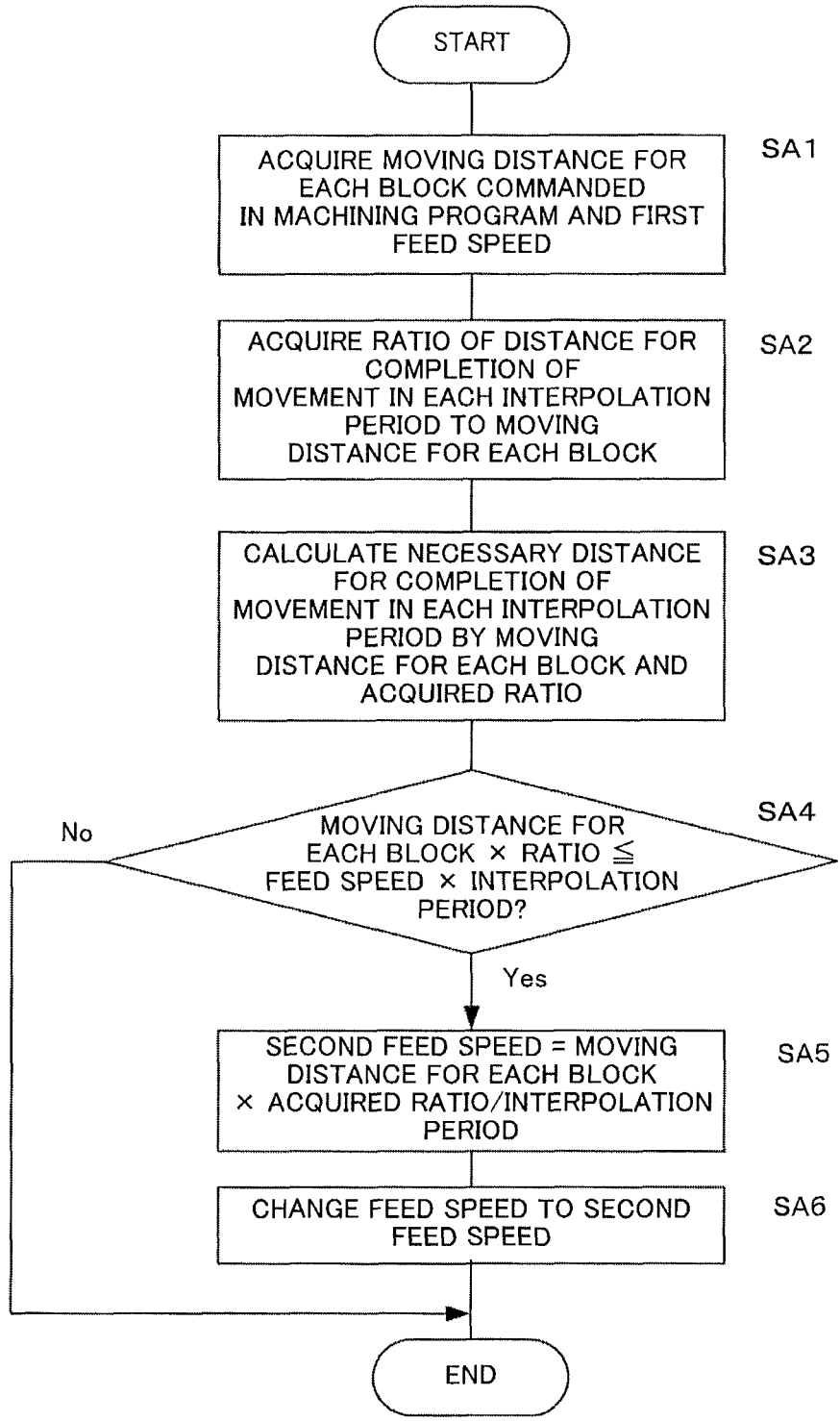
FIG. 4 is a flowchart showing a flow of feed speed control performed by a first embodiment of the numerical controller according to the present invention.

In the first embodiment described above, the value obtained by multiplying the moving distance for each block by the ratio input from the input device is compared with the moving distance for each interpolation period based on the first feed speed (Step SA4 in the flowchart of FIG. 4). Instead, according to this third embodiment, the feed speed is changed depending on whether or not a moving distance for each block is exceeded by a moving distance for each interpolation period based on a first feed speed. The following is a sequential description of steps of processing shown in the flowchart of FIG. 6.

[Step SC1] The moving distance for each block commanded in the machining program and an initially set first feed speed are acquired.

[Step SC2] It is determined whether or not the moving distance for each block acquired in Step SC1 is equal to or less than the moving distance for each interpolation period based on the first feed speed. If the moving distance for each block is equal to or less than the moving distance for each interpolation period based on the first feed speed (YES), the program proceeds to Step SC3. If the moving distance for each interpolation period based on the first feed speed is exceeded (NO), this processing ends.

[Step SC3] A speed for moving, in each interpolation period, the distance for each block acquired in Step SC1 is obtained as a second feed speed.

[Step SC4] An actual feed speed is changed to the second feed speed obtained in Step SC3.

Figure 7:
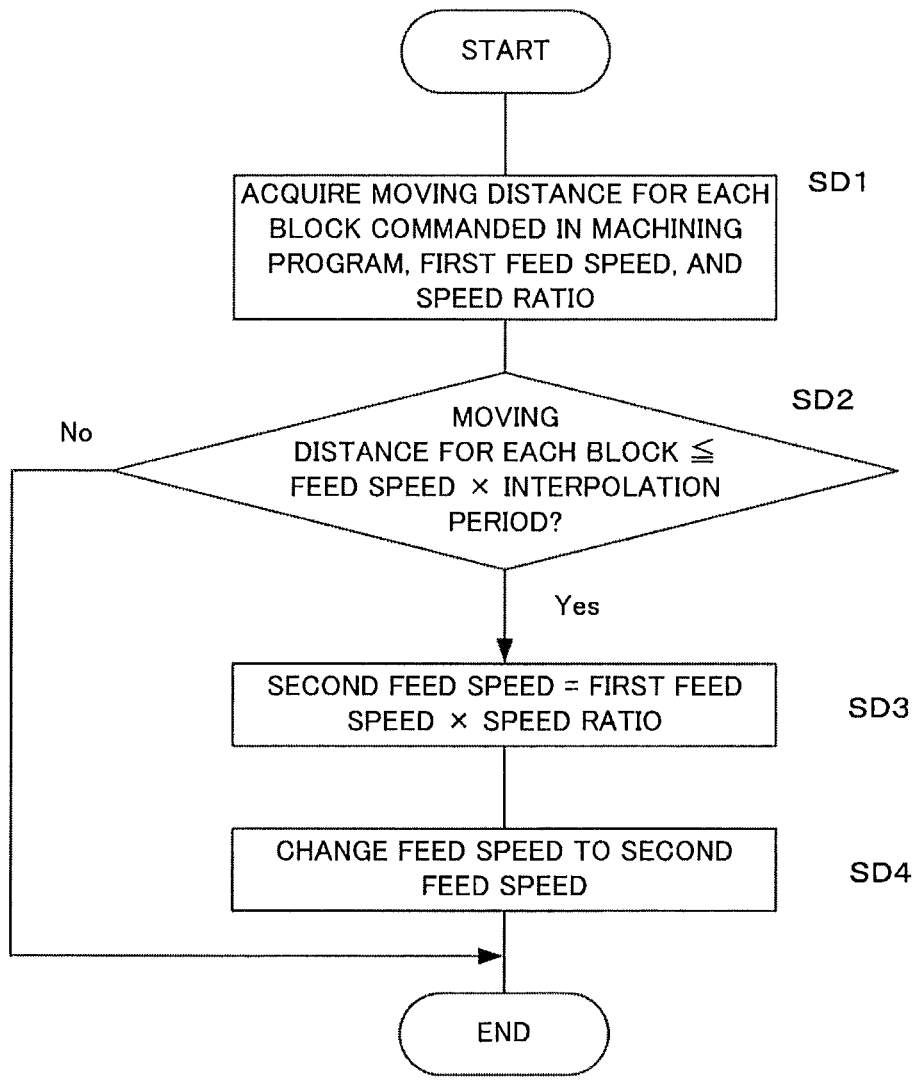
FIG. 7 is a flowchart showing a flow of feed speed control performed by a fourth embodiment of the numerical controller according to the present invention.

A flow of feed speed control performed by a fourth embodiment, a modification of the third embodiment, of the numerical controller according to the present invention will now be described with reference to the flowchart of FIG. 7.

According to this fourth embodiment, a changed feed speed is determined by multiplying an initially set feed speed by a preset ratio. The following is a sequential description of steps of processing shown in the flowchart of FIG. 7.

[Step SD1] A moving distance for each block commanded in the machining program, an initially set first feed speed, and a speed ratio for calculating the changed feed speed are acquired.

[Step SD2] It is determined whether or not the moving distance for each block acquired in Step SD1 is equal to or less than a moving distance for each interpolation period based on the first feed speed. If the moving distance for each block is equal to or less than the moving distance for each interpolation period based on the first feed speed (YES), the program proceeds to Step SD3. If the moving distance for each interpolation period based on the first feed speed is exceeded (NO), this processing ends.

[Step SD3] A second feed speed is obtained by multiplying the first feed speed by the speed ratio acquired in Step SC1.

[Step SD4] An actual feed speed is changed to the second feed speed obtained in Step SD3.

Figure 8:
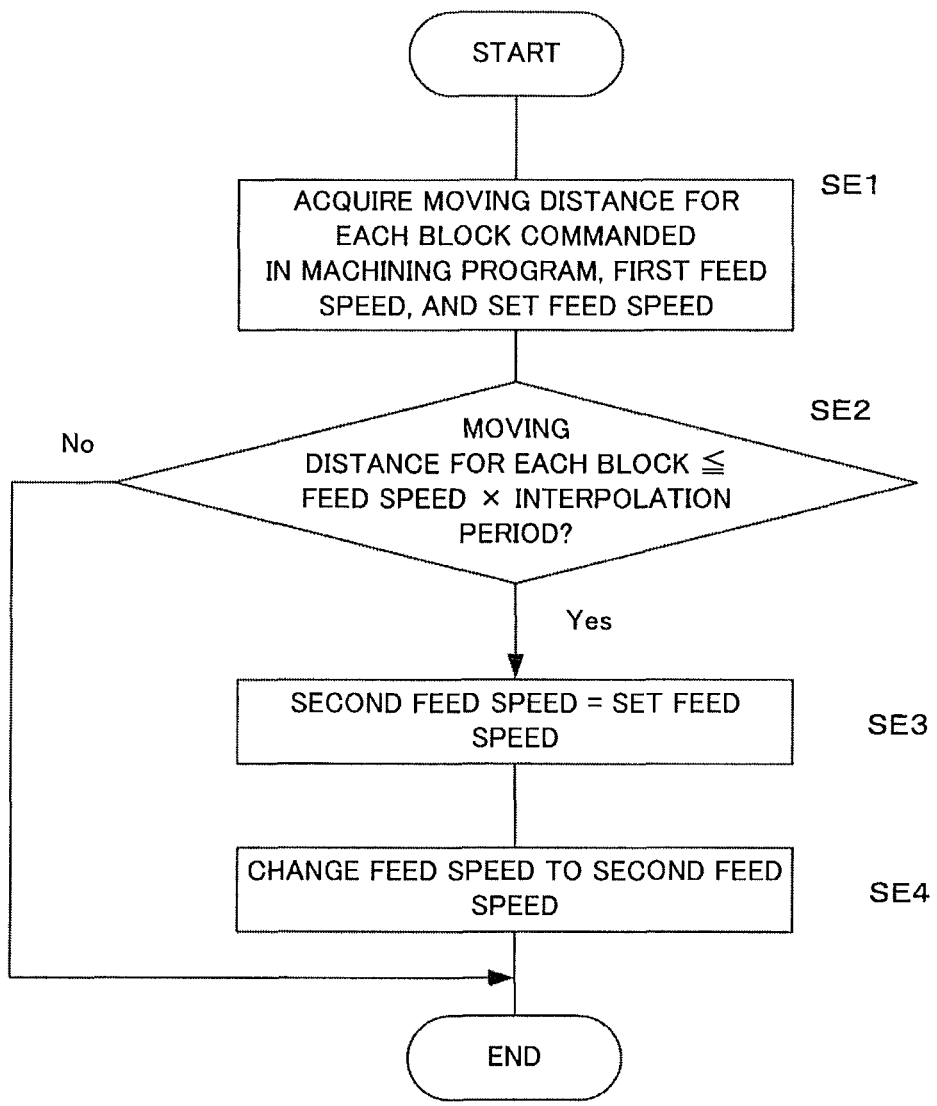
FIG. 8 is a flowchart showing a flow of feed speed control performed by a fifth embodiment of the numerical controller according to the present invention.

A flow of feed speed control performed by a fifth embodiment, another modification of the third embodiment, of the numerical controller according to the present invention will now be described with reference to the flowchart of FIG. 8.

According to this fifth embodiment, a changed feed speed is set to a predetermined speed. The following is a sequential description of steps of processing shown in the flowchart of FIG. 8.

[Step SE1] A moving distance for each block commanded in the machining program, an initially set first feed speed, and the changed feed speed are acquired.

[Step SE2] It is determined whether or not the moving distance for each block acquired in Step SE1 is equal to or less than a moving distance for each interpolation period based on the first feed speed. If the moving distance for each block is equal to or less than the moving distance for each interpolation period based on the first feed speed (YES), the program proceeds to Step SE3. If the moving distance for each interpolation period based on the first feed speed is exceeded (NO), this processing ends.

[Step SE3] The changed feed speed acquired in Step SE1 is set as a second feed speed.

[Step SE4] An actual feed speed is changed to the second feed speed.

The invention claimed is:

1. A numerical controller for controlling a path and a feed speed of a tool according to a machining program in which a first feed speed and a moving distance for each block are commanded, the numerical controller comprising:
   an input unit configured to input a ratio of a distance by which movement is completed in each interpolation period to a moving distance for each block;
   a moving ratio determination unit configured to determine whether the ratio inputted by the input unit is equal to or less than a predetermined ratio of the distance by which a movement is completed in each interpolation period to the moving distance for each block, corresponding to a block shape;
   a moving distance calculation unit configured to obtain a necessary distance for the completion of movement in each interpolation period based on the ratio input by the input unit and the moving distance for each block;
   a moving distance determination unit configured to determine whether or not the distance calculated by the moving distance calculation unit is shorter than the moving distance for each interpolation period based on the first feed speed;
   a moving speed calculation unit configured to calculate, as a second feed speed, a speed for moving, in each interpolation period, the distance obtained by the moving distance calculation unit if it is determined by the moving ratio determination unit that the ratio inputted by the input unit is equal to or less than the predetermined ratio of the distance by which a movement is completed in each interpolation period and it is determined by the moving distance determination unit that the distance calculated by the moving distance calculation unit is shorter than the moving distance for each interpolation period based on the first feed speed;

a commanded speed changing unit configured to change the feed speed to the second feed speed obtained by the moving speed calculation unit; and a notification unit configured to make notification if the ratio of the distance by which movement is completed in each interpolation period to the moving distance for each block, which is input by the input unit, is higher than that set in advance.

2. A numerical controller for controlling a path and a feed speed of a tool according to a machining program in which a first feed speed and a moving distance for each block are commanded, the numerical controller comprising:

an input unit configured to input a ratio of a distance by which movement is completed in each interpolation period to a moving distance for each block;

a moving distance determination unit configured to determine whether or not the moving distance for each block is shorter than a moving distance for each interpolation period based on the first feed speed;

a moving ratio acquiring unit configured to acquire a predetermined ratio of the distance by which a movement is completed in each interpolation period to the moving distance for each block, corresponding to a block shape;

a moving distance calculation unit configured to obtain a necessary distance for the completion of movement in each interpolation period based on the ratio input by the input unit and the moving distance for each block;

a moving speed calculation unit configured to obtain, as a second feed speed lower than the first feed speed, a speed for each block if it is determined by the moving distance determination unit that the moving distance for each block is shorter than the moving distance for each interpolation period based on the first feed speed;

a commanded speed changing unit configured to change the feed speed to the second feed speed obtained by the moving speed calculation unit; and a notification unit configured to make notification if the ratio of the distance by which movement is completed in each interpolation period to the moving distance for each block, which is input by the input unit, is higher than the predetermined ratio.

3. The numerical controller according to claim 2, wherein the moving speed calculation unit obtains, as the second feed speed, a speed for moving the moving distance for each block in each interpolation period.

4. The numerical controller according to claim 2, wherein the moving speed calculation unit calculates the second feed speed based on the first feed speed and a preset ratio.

5. The numerical controller according to claim 2, wherein the moving speed calculation unit uses a preset speed as the second feed speed.

* * * * *